(12) United States Patent
Campbell et al.

(10) Patent No.: US 10,963,635 B2
(45) Date of Patent: Mar. 30, 2021

(54) EXTENSIBILITY OF COMPOUND DATA OBJECTS

(71) Applicant: Microsoft Technology Licensing, LLC, Redmond, WA (US)

(72) Inventors: John Campbell, Woodinville, WA (US); Benjamin Edward Rampson, Woodinville, WA (US); Christian Canton, Bellevue, WA (US); Simon Peyton Jones, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/340,251

(22) Filed: Nov. 1, 2016

(65) Prior Publication Data

US 2017/0124051 A1 May 4, 2017

Related U.S. Application Data

(60) Provisional application No. 62/357,308, filed on Jun. 30, 2016, provisional application No. 62/249,869, (Continued)

(51) Int. Cl.
*G06F 3/048* (2013.01)
*G06F 40/18* (2020.01)
(Continued)

(52) U.S. Cl.
CPC ............ *G06F 40/18* (2020.01); *G06F 3/0482* (2013.01); *G06F 3/0486* (2013.01); *G06F 3/04842* (2013.01); *G06F 3/04883* (2013.01)

(58) Field of Classification Search
CPC .... G06F 17/246; G06F 17/245; G06F 17/211; G06F 17/24; G06F 3/0482;
(Continued)

(56) References Cited

U.S. PATENT DOCUMENTS 5,255,356 A * 10/1993 Michelman ........... G06F 17/246
715/212
5,317,686 A * 5/1994 Salas ...................... G06F 17/246
715/212
(Continued)

FOREIGN PATENT DOCUMENTS

WO 157744 8/2001
WO 2015065864 5/2015

OTHER PUBLICATIONS

"Creating Compound Objects", published: Sep. 2, 2010, publisher: OCLC, pp. 1-34 (Year: 2010).*
(Continued)

*Primary Examiner* — Wilson W Tsui
(74) *Attorney, Agent, or Firm* — NovoTechIP International PLLC

(57) ABSTRACT

Aspects of the present disclosure further provide the ability to define, among other features, the layout of the cell view of the cell in which the compound object is stored as well as the card view of the compound object. Aspects of the present disclosure further provide the ability to modify properties associated with the values stored in a compound object, including, but not limited to properties of calculated values, value formatting, and permissions.

20 Claims, 14 Drawing Sheets

Related U.S. Application Data filed on Nov. 2, 2015, provisional application No. 62/357,284, filed on Jun. 30, 2016, provisional application No. 62/249,884, filed on Nov. 2, 2015, provisional application No. 62/357,292, filed on Jun. 30, 2016.

(51) Int. Cl.
   *G06F 3/0482* (2013.01)
   *G06F 3/0484* (2013.01)
   *G06F 3/0486* (2013.01)
   *G06F 3/0488* (2013.01)

(58) Field of Classification Search
   CPC .... G06F 3/04842; G06F 40/18; G06F 3/0486; G06F 3/04883
   See application file for complete search history.

(56) References Cited

U.S. PATENT DOCUMENTS

| | | | |
|---|---|---|---|
| 5,510,980 A | 4/1996 | Peters | |
| 5,548,703 A | 8/1996 | Berry et al. | |
| 5,890,174 A | 3/1999 | Khanna et al. | |
| 5,933,638 A * | 8/1999 | Cencik | G06F 8/20 703/13 |
| 5,983,268 A | 11/1999 | Freivald et al. | |
| 6,138,130 A | 10/2000 | Adler et al. | |
| 6,292,811 B1 * | 9/2001 | Clancey | G06F 17/247 705/30 |
| 6,317,758 B1 | 11/2001 | Madsen | |
| 6,377,965 B1 | 4/2002 | Hachamovitch et al. | |
| 6,606,633 B1 | 8/2003 | Tabuchi | |
| 6,631,497 B1 | 10/2003 | Jamshidi et al. | |
| 6,640,234 B1 | 10/2003 | Coffen | |
| 6,701,485 B1 | 3/2004 | Igra et al. | |
| 6,920,608 B1 | 7/2005 | Davis | |
| 6,986,099 B2 | 1/2006 | Todd | |
| 6,988,241 B1 | 1/2006 | Guttman et al. | |
| 7,007,033 B1 | 2/2006 | Rothschiller et al. | |
| 7,076,491 B2 | 7/2006 | Tsao | |
| 7,099,890 B2 | 8/2006 | Cahill et al. | |
| 7,350,141 B2 | 3/2008 | Kotler et al. | |
| 7,424,668 B2 | 9/2008 | DeSpain | |
| 7,451,397 B2 | 11/2008 | Weber et al. | |
| 7,461,077 B1 | 12/2008 | Greenwood | |
| 7,647,551 B2 | 1/2010 | Vigesaa et al. | |
| 7,735,003 B1 | 6/2010 | Hearn et al. | |
| 7,761,782 B1 | 7/2010 | Warren et al. | |
| 7,962,436 B2 | 6/2011 | Brelage et al. | |
| 8,091,024 B2 | 1/2012 | Graeber | |
| 8,166,385 B2 | 4/2012 | Garcia-Molina et al. | |
| 8,370,750 B2 | 2/2013 | Adachi et al. | |
| 8,601,361 B2 | 12/2013 | Berger et al. | |
| 8,640,022 B2 | 1/2014 | Waldman et al. | |
| 9,020,999 B2 | 4/2015 | Rai | |
| 9,098,484 B2 | 8/2015 | Viry | |
| 9,798,889 B1 * | 10/2017 | Karpel | G06F 21/6227 |
| 10,311,141 B1 | 6/2019 | Olkin | |
| 10,331,771 B2 | 6/2019 | Maresca | |
| 2003/0004853 A1 * | 1/2003 | Ram | G06Q 40/04 705/37 |
| 2003/0182413 A1 | 9/2003 | Allen et al. | |
| 2005/0097464 A1 | 5/2005 | Graeber | |
| 2005/0119990 A1 | 6/2005 | Lee et al. | |
| 2006/0048044 A1 | 3/2006 | Genesereth et al. | |
| 2006/0179012 A1 | 8/2006 | Jacobs | |
| 2006/0206808 A1 | 9/2006 | Jasthi et al. | |
| 2006/0212469 A1 | 9/2006 | Babanov et al. | |
| 2007/0050702 A1 | 3/2007 | Chopin et al. | |
| 2007/0078872 A1 | 4/2007 | Cohen | |
| 2007/0136652 A1 * | 6/2007 | Ellis | G06F 17/246 715/210 |
| 2008/0016436 A1 | 1/2008 | Liu et al. | |
| 2008/0046804 A1 * | 2/2008 | Rui | G06F 17/246 715/212 |
| 2008/0134089 A1 | 6/2008 | Adachi et al. | |
| 2008/0215959 A1 | 9/2008 | Lection | |
| 2009/0006466 A1 | 1/2009 | Ellis et al. | |
| 2009/0044090 A1 | 2/2009 | Gur et al. | |
| 2009/0160861 A1 | 6/2009 | Nakano | |
| 2009/0307190 A1 | 12/2009 | Maresca | |
| 2010/0083079 A1 | 4/2010 | Rapp et al. | |
| 2010/0131570 A1 | 5/2010 | Weinberg | |
| 2011/0022629 A1 | 1/2011 | Glover | |
| 2011/0314365 A1 | 12/2011 | Messerly | |
| 2012/0151315 A1 | 6/2012 | Campbell et al. | |
| 2012/0192050 A1 | 7/2012 | Campbell et al. | |
| 2012/0324421 A1 | 12/2012 | Boeckenhauer et al. | |
| 2013/0036346 A1 | 2/2013 | Cicerone | |
| 2013/0067305 A1 | 3/2013 | Golan | |
| 2013/0110884 A1 | 5/2013 | Eakins | |
| 2013/0298002 A1 | 11/2013 | Viry | |
| 2014/0074878 A1 | 3/2014 | Bomea et al. | |
| 2014/0122516 A1 | 5/2014 | Brewer et al. | |
| 2014/0359417 A1 | 12/2014 | Bar-On | |
| 2014/0372854 A1 | 12/2014 | Otero et al. | |
| 2014/0372857 A1 | 12/2014 | Otero et al. | |
| 2014/0372952 A1 | 12/2014 | Otero et al. | |
| 2015/0019540 A1 | 1/2015 | Ganjam et al. | |
| 2015/0142418 A1 | 5/2015 | Byron | |
| 2015/0161250 A1 | 6/2015 | Elbaz | |
| 2015/0242093 A1 * | 8/2015 | Yost | G06F 3/04842 715/763 |
| 2016/0070733 A1 | 3/2016 | Gould | |
| 2016/0117412 A1 * | 4/2016 | Mungi | G06F 17/30545 707/774 |
| 2016/0224536 A1 | 8/2016 | Thomas | |
| 2017/0124049 A1 | 5/2017 | Campbell et al. | |
| 2017/0124050 A1 | 5/2017 | Campbell et al. | |
| 2017/0124052 A1 | 5/2017 | Campbell et al. | |
| 2017/0124053 A1 | 5/2017 | Campbell et al. | |
| 2017/0124054 A1 | 5/2017 | Campbell et al. | |
| 2017/0337040 A1 | 11/2017 | Salvi et al. | |
| 2020/0202069 A1 | 6/2020 | Campbell et al. | |

OTHER PUBLICATIONS

Stanley Zarowin, Title: "Hiding cells in Excel—just one or two or even 100 at a time", published: Oct. 1, 2008, publisher: Journal of Accountancy, pp. 1-2 (Year: 2008).*

"Setting up Excel Spreadsheets for Single Item or Compound Object Metadata", Published on: Sep. 7, 2015, 6 pages, available at: http://www.nyheritage.org/sites/default/files/docs/MetadataExcel.pdf.

An Introduction to Data Validation in Excel, Published on: Mar. 15, 2014, http://trumpexcel.com/2014/03/learn-all-about-data-validation-in-excel/, 4 pages.

Canton et al., "Compound Data Types", Oct. 2, 2015, 16 pages.

Canton et al., "Condensed Core Design", Jul. 30, 2015, 312 pages.

Canton et al., "Rich Data Types", Jul. 30, 2015, 217 pages.

Chang, et al., "A spreadsheet model for using web service data", In Proceedings of IEEE Symposium on Visual Languages and Human-Centric Computing, Jul. 28, 2014, 8 pages.

Chang, et al., "Creating interactive web data applications with spreadsheets", In Proceedings of the 27th annual ACM symposium on User interface software and technology, Oct. 5, 2014, pp. 87-96.

Create an Excel Drop Down list with Search Suggestions, Published on: Oct. 19, 2013, http://trumpexcel.com/2013/10/excel-drop-down-list-with-search-suggestions/, 11 pages.

French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.

Hoydahl, Jan, "Cominvent AS—Enterprise Search Consultants", Published on: Jan. 25, 2012, http://www.cominvent.com/2012/01/25/super-flexible-autocomplete-with-solr/, 4 pages.

In-Cell Dropdown and Validation in Spreadsheets, Published on: Aug. 26, 2010, http://googledrive.blogspot.n/2010/08/in-cell-dropdown-and-validation-in.html, 27 pages.

(56) References Cited

OTHER PUBLICATIONS

Levoy, Marc, "Spreadsheets for Images", In Proceedings of 21st International ACM Conference on Computer Graphics and Interactive Techniques, Jul. 24, 1994, 8 pages.
Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
PCT International Search Report in PCT/US2016/060190, dated Feb. 9, 2017, 13 pages.
Kongdenfha et al., "Rapid development of spreadsheet-based web mashups", International World Wide Web Conference 18th ACM, Madrid, Apr. 20, 2009, 10 pages.
PCT International Search Report in PCT/US2016/060188, dated Feb. 15, 2017, 13 pages.
Bakke et al., "A spreadsheet-based user interface for managing plural relationships in structured data", Human Factors in Computing Systems, May 7, 2011, 10 pages.
Kapros et al., "Updating database schemas without breaking the UI: modeling using cognitive semantic categories" Proceedings of the 2014 ACM Sigchi Symposium on Engineering Interactive Computing System, Jun. 17, 2014, 9 pages.
PCT International Preliminary Report on Patentability in PCT/US2016/060188, dated Feb. 12, 2018, 8 pages.
U.S. Appl. No. 15/340,422, Office Action dated Feb. 22, 2018, 10 pages.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/059947, dated May 8, 2018, 13 pages.
PCT International Preliminary Report on Patentability in PCT/US2016/060190 dated May 8, 2018, 9 pages.
U.S. Appl. No. 15/340,422, Amendment and Response filed May 22, 2018, 18 pages.
European Communications in Application 16798045.7, dated Jun. 8, 2018, 4 pages.
Robin Abraham and Martin Erwig, How to communicate unit error messages in spreadsheets, 30 ACM SIGSOFT Software Engineering Notes, pp. 1-5, 2005.
U.S. Appl. No. 15/340,422, Office Action dated Jun. 13, 2018, 15 pages.
Wilbert O. Galitz, The Essential Guide to user Interface Design 535, 2nd edition, Wiley, 2002, 786 pages.
PCT International Search Report in PCT/US2016/060025, dated Apr. 7, 2017, 23 pages.

Brian C. Whitmer, "Brigham Young University Improving Spreadsheets for Complex Problems", All Theses and Dissertations, Paper 1713, Apr. 8, 2008, http://scholarsarchive.byu.edu/cgi/viewcontent.cgl?artcile=2712&context=etd, pp. 1-7, 15-26.
Chang, et al., "A Spreadsheet Model for Handling Streaming Data", In Proceedings of the 33rd Annual ACM Conference on Human Factors in Computing Systems, Apr. 18, 2015, 4 pages.
PCT Invitation to Pay Additional Fees in PCT/US2016/060180, mailed Feb. 9, 2017, 8 pages.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
PCT Second Written Opinion in PCT/US2016/060188, dated Sep. 13, 2017, 7 pages.
PCT International Search Report in PCT/US2017/040251, dated Dec. 18, 2017, 14 pages.
"PCT International Preliminary Report on Patetability in PCT/US2017/040251", dated Jan. 1, 2019. 8 pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"Non Final Office Action Issued in U.S. Appl. No. 15/340,321", dated Oct. 17, 2018, 11 Pages.
"Non Final Office Action Issued in U.S. Appl. No. 15/340,374", dated Sep. 7, 2018, 10 Pages.
"Non Final Office Action Issued in U.S. Appl. No. 15/340,422", dated Sep. 26, 2018, 11 Pages.
"Final Office Action Issued in U.S. Appl. No. 15/340,201", dated Jul. 11, 2019, 15 Pages.
"Final Office Action Issued in U.S. Appl. No. 15/340,321", dated Jul. 5, 2019, 13 Pages.
"Final Office Action Issued in U.S. Appl. No. 15/340,374", dated Apr. 5, 2019, 11 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Notice of Allowance Issued in U.S. Appl. No. 15/340,422", dated Jun. 10, 2019, 6 Pages.
"Notice of Allowance Issued in U.S. Appl. No. 15/340,187", dated Sep. 18, 2019, 9 Pages.
"Advisory Action Issued in U.S. Appl. No. 15/340,321", dated Sep. 24, 2019, 6 Pages.
"Non Final Office Action Issued in U.S. Appl. No. 15/340,321", dated Nov. 4, 2019, 12 Pages.
"Final Office Action Issued in U.S. Appl. No. 15/340,422", dated Feb. 11, 2019, 12 Pages.
"Non Final Office Action Issued in U.S. Appl. No. 15/340,201", dated Apr. 24, 2020, 16 Pages.
"Final Office Action Issued in U.S. Appl. No. 15/340,321", dated Apr. 17, 2020, 23 Pages.
"Final Office Action Issued in U.S. Appl. No. 15/340,201", dated Sep. 22, 2020, 16 Pages.
"Notice of Allowance Issued In U.S. Appl. No. 15/340,321", dated Sep. 28, 2020, 12 Pages.
Itoh, et al., "A Framework for Constructing Coordinated Multiple 3D Visualization of Excel", In Proceedings of the 13th International Conference Information Visualisation, Jul. 2009, pp. 162-170.

* cited by examiner

FIG. 2

Cell B4 Person Schema Properties

| Field | Calculated Value | Format | Permissions | Visible in Cell |
|---|---|---|---|---|
| x Name | | General String | ☐ | ☑ |
| x Age | Today( ) - Birthday | Number | ☐ | ☑ |
| x Birthday | | Short Date (mm/dd/yyyy) | ☐ | ☐ |
| x Address | | Compound (Address) | ☑ | ☑ |
| ... | ... | ... | ... | ... |
| x Salary | | Number | ☑ | ☐ |
| +[New] | | | | |

404 → Field
406 → Calculated Value
408 → Format
410 → Permissions
412 → Visible in Cell
402

◁ ▷

[OK] [CANCEL]

FIG. 4A

Cell D1 Person Schema Properties — 414

| Field | Calculated Value / Format | Permissions | Visible in Cell |
|---|---|---|---|
| x Name | General String | ☐ | ☑ |
| x Email | General String | ☐ | ☑ |
| x City | Map Image [URL] | ☐ | ☐ |
| +[New] | | | |

◁ ▷

[CANCEL] [OK]

404 → Field
406 → Calculated Value
408 → Format
410 → Permissions
412 → Visible in Cell

FIG. 4B

# EXTENSIBILITY OF COMPOUND DATA OBJECTS

CROSS-REFERENCE TO RELATED APPLICATIONS

The present application claims priority to U.S. Provisional Application Ser. No. 62/357,308, filed Jun. 30, 2016 and entitled "Extensibility of Compound Data Objects;" U.S. Provisional Application Ser. No. 62/249,869, filed Nov. 2, 2015 and entitled "Rich Data Types;" U.S. Provisional Application Ser. No. 62/357,284, filed Jun. 30, 2016 and entitled "Rich Data Types;" U.S. Provisional Application Ser. No. 62/249,884, filed Nov. 2, 2015 and entitled "Compound Data Objects;" and U.S. Provisional Application Ser. No. 62/357,292, filed Jun. 30, 2016 and entitled "Compound Data Objects," the disclosures of which are incorporated herein by reference in their entirety.

BACKGROUND

Today, spreadsheet applications are used to organize and store data in a plurality of cells, wherein each cell holds a single value. Because only a single value is stored in a single cell, spreadsheets can quickly become extensive and cumbersome, spreading data over multiple cells across multiple rows and columns. This type of organization oftentimes leads to large, complex spreadsheets, which may be difficult to consume and comprehend. Additionally, spreadsheet applications are subject to strict display and layout options. In particular, in today's spreadsheet applications, the cell view displays the entirety of the value stored therein. Accordingly, sizing cells and modifying fonts enhance readability can be cumbersome.

It is with respect to these and other general considerations that embodiments have been described. Although relatively specific problems have been discussed, it is understood that the embodiments should not be limited to solving the specific problems identified in the background.

SUMMARY

Aspects of the present disclosure are directed toward the extensibility of compound objects.

In a first aspect, disclosed is a system comprising: at least one processing unit; and at least one memory storing computer executable instructions that, when executed by the at least one processing unit, cause the system to perform a method, the method comprising: receiving a compound object, wherein the compound object includes one or more values organized according to a schema, the schema including a field corresponding to each value and one or more properties associated with each field; receiving an indication of a change to the schema; and updating the schema.

In a second aspect, disclosed a method for updating one or more views of a compound object stored in a spreadsheet of a spreadsheet application, the method comprising: receiving a compound object, wherein the compound object includes one or more values organized according to a schema, the schema including a field corresponding to each value and one or more properties associated with each field; receiving an indication of a change to the schema; and updating the schema.

In a third aspect, disclosed is a computer-readable storage medium storing computer executable instructions that, when executed by at least one processing unit, cause a computing device to: receive a compound object, wherein the compound object includes one or more values organized according to a schema, the schema including a field corresponding to each value and one or more properties associated with each field; receive an indication of a change to the schema; and update the schema.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates an example compound object stored in a spreadsheet.

FIG. 4A illustrates an example schema properties user interface.

FIG. 4B illustrates an alternative example schema properties user interface for the first compound object illustrated in FIG. 3.

DETAILED DESCRIPTION

Figure 1:
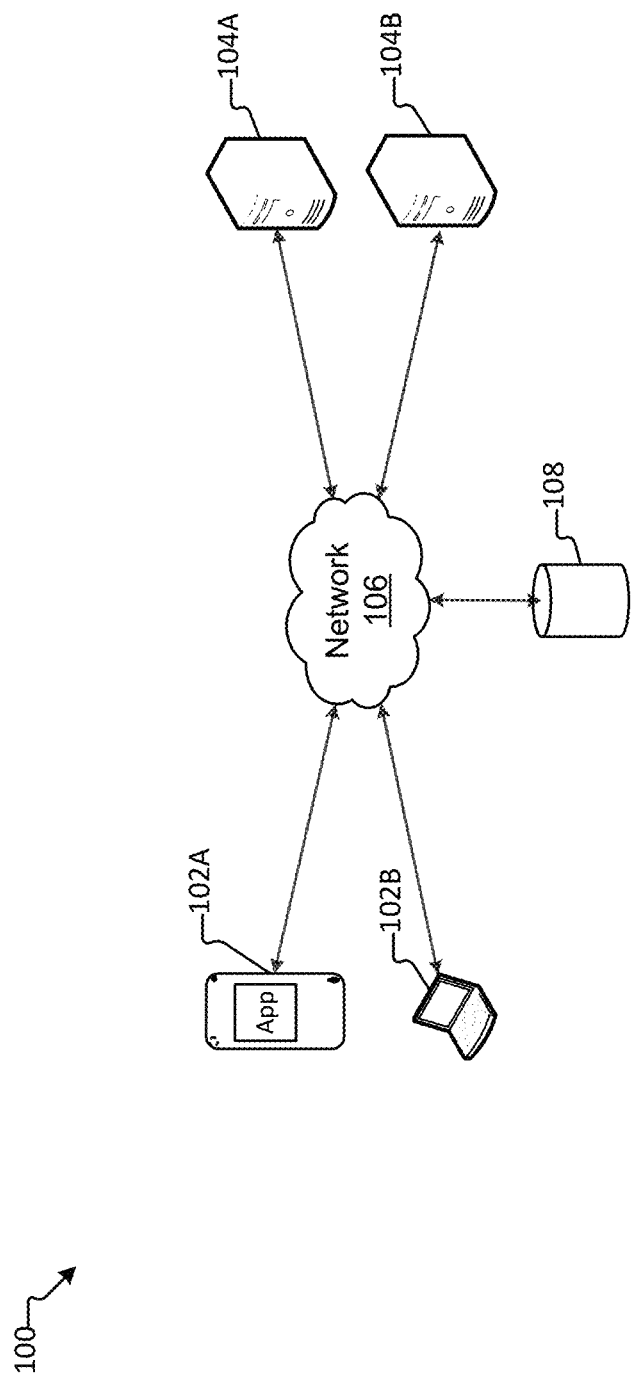
FIG. 1 illustrates a system for implementing compound data types in a spreadsheet application, according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As described herein, present spreadsheet applications store data such that each cell of the spreadsheet only stores a single value. A compound object is a value that stores multiple values in a single cell, wherein those multiple values are organized according to a defined structure. The compound object may store multiple values as entities in a single cell, wherein those entities are stored according to a known data structure such as, for example, records, vectors, matrices, tables, and arrays. In other embodiments, the compound object may store multiple values as another data structure, such as, for example, a user-defined data structure. In other embodiments, the compound object may store multiple values as any nested combination of any one of the known data structures (e.g., nesting an array within a vector, or nesting one or more records within a record, or nesting matrices within a table, etc.). The multiple values stored in the compound object are also individually referenceable and can fully participate with spreadsheet functionality including calculations, referencing, and formatting. Compound objects typically store related values. For example, compound objects can store details about a person (e.g., first name, last name, birthdate, address, social security number, etc.), a company (e.g., name, address, phone number, officer names, etc.), a stock (e.g., stock ticker symbol, closing price, average price, volume, dividends, etc.), a product (e.g., product name, price, specifications, description, options, store locations, etc.), a car (e.g., make, model, year, price, colors, image of car, etc.), etc. Although only a few examples are provided, the present disclosure is not intended to be limited to these specific examples. It is understood that compound objects can store virtually any type of information in an efficient and compact manner. Accordingly, compound objects may be used to more efficiently, more logically, more compactly, and more simply store information because multiple values can be stored in a single cell rather than spread across numerous rows and columns of a spreadsheet. The novel aspects of a compound object can therefore reduce the size and complexity of a spreadsheet. Compound objects are further described in U.S. Provisional Application Ser. No. 62/249,884, entitled "Compound Data Objects," and U.S. Provisional Application Ser. No. 62/357,292, entitled "Compound Data Objects," the disclosures of which are incorporated herein by reference in their entirety.

Furthermore, compound objects may be extended to include user-defined compound object types. A compound object type is a structural definition of a compound object that can be reused or shared. The structural definition of the compound object may be expressed by a schema. A schema may identify the data structure by which the values are organized (e.g., record, vector, matrix, table, array, or other data structure) and properties of the compound object (e.g., types of values to be received, a particular pattern by which values are received, cell and card views, validation rules, behavior of the compound object in calculations, etc.). Accordingly, a compound object type defines the compound object's structure and rules. In an example, a "Person" compound object type may define the compound object structure as a record, which therefore organizes values in attribute-value pairs. The "Person" compound object type may further define the type values to be received for each attribute as well as any validation conditions. Therefore, when the "Person" compound object type is opened and ready to be populated with values, the attributes are provided and organized according to the pre-defined structure. The structural definition, or the schema, of the compound object type can be stored and reused or shared. Accordingly, another user can open the stored compound object type having and populate it with that user's own values, wherein the populated values are organized according to the defined structure. In some embodiments, a cell may have an implied schema that is not a named schema. For example, a cell might not be a "Person" yet still have a view in which properties such as, for example, display properties can be set. In such an embodiment, the schema could display with the names of relevant cell references.

Aspects of the present disclosure further provide the ability to define, among other features, the layout of the cell view of the cell in which the compound object is stored. In particular, because a compound object stores multiple values, it might be preferable to display a subset of those values in the cell view. Aspects of the present disclosure further provide the ability to define the layout of a card view that includes a full or expanded view of the values stored in the compound object. Aspects of the present disclosure further provide the ability to define properties, permissions, third party rendering code, etc.

Further aspects of the present disclosure also provide the ability to modify the rendering of the values stored in the compound object and as displayed from the cell view and card view so as to be more easily understood. For example, an array of numbers might be better displayed and understood by a user if rendered in a chart. Accordingly, aspects of the present disclosure further provide the ability to extend the structure of the compound object and the display of values within the cell and card views.

FIG. 1 illustrates a system 100 for implementing compound data types in a spreadsheet application, according to an example embodiment.

As illustrated, system 100 may include one or more client computing devices 102 (e.g., client computing devices 102A and 102B) that may execute a client version of a spreadsheet application capable of storing multiple values as a compound object in a single cell of a spreadsheet. In some examples, the client spreadsheet application may execute locally on a client computing device 102. In other examples, a client spreadsheet application (e.g., a mobile app on a thin client computing device 102) may operate with a corresponding server version of spreadsheet application executing on one or more server computing devices. In such embodiments, the client computing device 102 may communicate with the corresponding server version of the spreadsheet application over a network (e.g., network 106). In still other aspects, rather than executing a client version of a spreadsheet application, the one or more client computing devices 102 may remotely access, e.g., via a browser over a network (e.g., network 106), the spreadsheet application implemented on a server computing device or multiple server computing devices (e.g., in a distributed computing environment such as a cloud computing environment).

In a basic configuration, the one or more client computing devices 102 are personal or handheld computers having both input elements and output elements operated by one or more users. For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application may be configured to store, in a single cell of a spreadsheet, a compound object that stores multiple values. A compound object may store values comprising one or more of: character strings, numbers, images, graphs, charts, and the like. Other values may also be, for example, graphs; charts; photographs; audio files; video files; imported, dynamically updatable data; etc. The compound object may store multiple values according to a known data structure such as, for example, records, vectors, matrices, tables, and arrays. In other embodiments, the compound object may store multiple values as another data structure, such as, for example, a user-defined data structure. In other embodiments, the compound object may store multiple values as any nested combination of any one of the known data structures (e.g., nesting an array within a vector, or nesting one or more records within a record, or nesting matrices within a table, etc.).

The spreadsheet application may be implemented on a server computing device (e.g., server computing device 104A and 108B). In a basic configuration, server computing device 104 may include at least a processing unit and a system memory for executing computer-readable instructions. In some aspects, server computing device 104 may comprise one or more server computing devices 104 in a distributed environment (e.g., cloud computing environment). Server computing device 104 may provide data, associated with cells of a spreadsheet to and from the one or more client computing devices 104 and/or one or more other server computing devices via network 106.

As used herein, each compound object may be stored and may be retrieved based on a reference pointer or a file locator, which may be a uniform resource locator (URL) identifying a file path from a local storage location or a remote storage location. For instance, one or more compound objects may be stored in a storage location (e.g., storage 108) accessible to spreadsheet application. Still further, compound object types may be saved as schema definitions in storage (e.g., storage 108). Furthermore, aspects of the present disclosure contemplate the ability to re-use and share saved schema definitions. In some embodiments, saved schemas will roam with a particular user, based on, for example, a user's identification and associated credentials. In other embodiments, schemas are stored in a shared database, for example, and shared among users.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
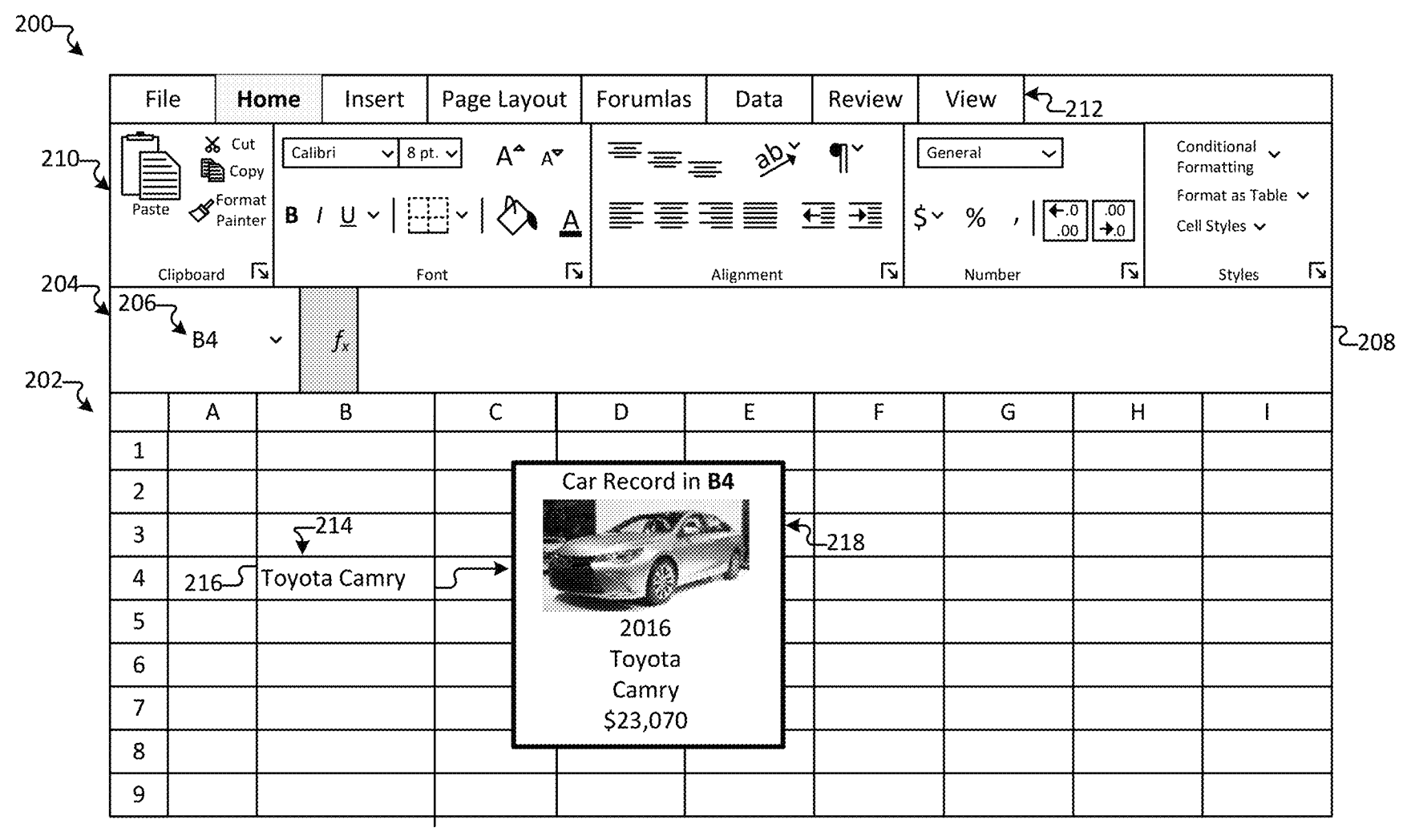

FIG. 2 illustrates an example compound object stored in a spreadsheet.

As illustrated, an interface 200 of a spreadsheet application is provided. Interface 200 includes a spreadsheet having a plurality of cells 202, a navigation ribbon 204 (including a cell identifier 206 and a formula bar 208), and a toolbar 210. In some embodiments, the toolbar 210 is part of the navigation ribbon 204. Interface 200 further includes a plurality of tabs 212 for accessing various aspects and operations of the spreadsheet application.

Because compound objects can store multiple values, and even nested values in a single cell, some values may not be displayed from the cell view, based on the size of the cell or other considerations (e.g., user might elect to hide certain values from the cell view). Accordingly, aspects of the present disclosure provide the ability to define the layout of the cell view. Accordingly, a full or partial view of the compound object may be displayed in the cell view, based on, for example, user-defined preferences. Additionally, based on a selection of the compound object, a card view of that compound object, including all the values stored therein, may be displayed. In some embodiments, the card view may be displayed as an object that floats over the spreadsheet while in other embodiments the card view is displayed in a task pane or other user interface. As described herein, aspects of the present disclosure also provide the ability to define the layout of the card view.

Illustrated is a compound object 214 stored in cell B4 216. As illustrated in this example, the compound object 214 stores an array of a car having multiple values. As described herein, the cell view may not always display each value or even the field stored in the compound object. In the example illustrated, the compound object 214 only displays, in the cell view, a single value (e.g., "Toyota Camry") and does not display any other value. Aspects provided herein describe the ability to define the layout of the cell view.

Also illustrated in FIG. 2 is an example card view 218 of the compound object 214. The card view 218 displays additional values of the array: an image of the car, the year of the car (e.g., "2016), as well as the price of the car (e.g., "$23,070"). In some embodiments, the card view displays all the values stored in the compound object, additional fields or calculated data (based on data stored in the compound object or outside the compound object), or even a subset of values stored in the compound object. In another example, security permissions may limit a user's ability to view information in a compound object. As will be described in further detail herein, values of a compound object may have associated security permissions, and as such, those particular values may only be viewable to users with the appropriate permission level. Accordingly, a user without the appropriate permission level will not be allowed to view those values, either in the cell view or card view. Referring back to FIG. 2, the card view 218 further displays a particular layout of each value. In this example, the card view 218 displays the image of the car at the top of the card and the values listed below the image. Aspects herein further provide a user definable layout for the card view, wherein values can be laid out in any desired order and arrangement. Furthermore, values stored in the compound object may be cached or stored locally and may even be encrypted. In other embodiments, values could also be stored by a service or on a server in communication with the spreadsheet application, and may be retrieved based on permission checks.

Figure 3:
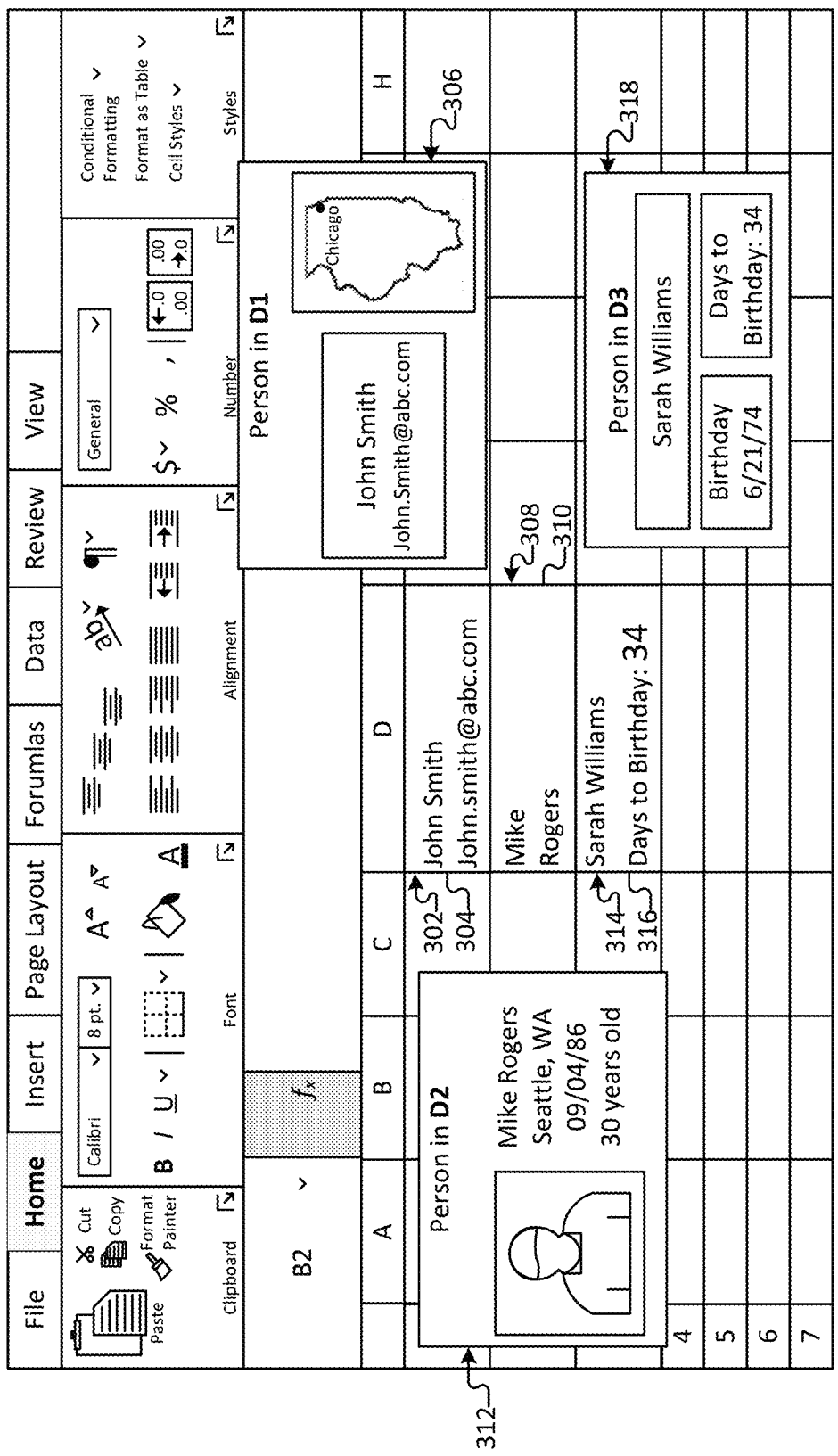
FIG. 3 illustrates example cell and card views of compound objects stored in a spreadsheet.

FIG. 3 illustrates example cell and card views of compound objects stored in a spreadsheet.

Illustrated are three compound objects stored in the spreadsheet: a first compound object 302 stored in cell D1 304 having card view 306, a second compound object 308 stored in cell D2 310 having card view 312, and a third compound object 314 stored in cell D3 316 having card view 318. Accordingly, as illustrated, each compound object has a cell view and a card view.

Aspects of the present disclosure provide the ability to define the layout of the cell view and card view. In particular, a user can control what values are shown in both views and how those values are laid out. Novel aspects further provide the ability to define multiple card views and cell views for a particular compound object. In the illustrated example, the first compound object 302, second compound object 308, and third compound object 314 all store information about a person. The first compound object 302 stores information about a person having a name field, an email address field, and a city field; the second compound object 308 stores information about a person having a name field, an image field, a city field, and an age field; and the third compound object 314 stores information about a person having a name field, a birthday field, and a calculated number of days until birthday field. Accordingly, each compound object stores a different variation of fields and therefore different values.

As illustrated in FIG. 3, aspects provide the ability to define a cell view, wherein the cell view displays some or all the values stored in the compound object. In another embodiment, all three compound objects may have the same schema (e.g., the same fields and properties). In such an example, the schema may have the same fields and the same properties, however the user may define various views that display some or all of the values as well as the layout of those values. The user may therefore select a particular view for each compound object.

In the example illustrated, the cell view of the first compound object 302 displays only the values associated with the name field (e.g., "John Smith") and email address field (e.g., "John.smith@abc.com"). The cell view of the second compound object 308 displays only the values associated with the name field (e.g., "Mike Rogers"). Finally, the cell view of the third compound object 314 displays only the values associated with the name field (e.g., "Sarah Williams") and the number of days until birthday field (e.g., "Days to Birthday: 34"). Accordingly, each compound object illustrated in FIG. 3 has a different cell view. As described herein, the different cell views may be based on the different fields and values stored in each compound object (i.e., different schemas), or it may be because the compound objects each use the same schema (and therefore the same fields), but the user may have selected a different cell view for each compound object. In some embodiments, the layout of the cell view may be dynamically and automatically responsive to cell resizing events in the spreadsheet (e.g., by enlarging or reducing the size of the cell, the layout may be dynamically updated).

Moreover, in this example, each card view is also different. Similar to the cell views, the card views may be different because each compound object stores different fields and values (i.e., different schemas), or it may be because the compound objects each use the same schema but the user may have selected a different card view for each compound object. As will be described in further detail herein, the card view displays some or all the values stored in the compound object. In some embodiments, the corresponding fields may also be displayed in the card view (and even in the cell view). The card view 306 of the first compound object 302 displays the value associated with the name field (e.g., "John Smith"), the value associated with the email address field (e.g., "John.Smith@abc.com"), and the value associated with the city field (e.g., map rendering of Chicago). Additionally, the card view 312 of the second compound object 308 displays the value associated with the image of the person field, the value associated with the name field (e.g., "Mike Rogers"), the value associated with the city field (e.g., "Seattle, Wash."), the value associated with the birthday field (e.g., "Sep. 4, 1986"), and the value associated with the age field (e.g., "30 years old"). Finally, the card view 318 of the third compound object 314 displays the value associated with the name field (e.g., "Sarah Williams"), the value associated with the birthday field (e.g., "Jun. 21, 1974"), and the value associated with the number of days until birthday field (e.g., "Days to Birthday: 34"). Accordingly, as illustrated the card view of each compound object differs from the respective cell view, although in some embodiments the card view is similar to the cell view. Furthermore, in some embodiments, the layout of the card view may be dynamically and automatically responsive to resizing of the card view (e.g., by enlarging or reducing the size of the card view, the layout may be dynamically updated).

Additionally or alternatively, views may be automatically generated based on the type of data and the spreadsheet application's understanding of how that data is typically used (for example if a field is commonly referenced, it may be automatically displayed in the cell view). Furthermore, machine learning techniques can be applied to improve automatic layouts of the cell view and the card view over time. In particular, users or developers can choose to organize the cell view and the card view automatically, or choose from a well-defined layout. Also, the same spreadsheet can have different preferences chosen by different users. Accordingly, the views and layouts can be customized based on the viewer of the spreadsheet.

In some embodiments, users can create defined views that have different representations based on the data stored in the compound object. For example, a person compound object may have different card views based on the data stored therein (e.g., details of the person). In an example, a view of a compound object storing details of a two year old may differ from a view of a compound object storing details of a twenty year old (because some of the fields may not be relevant for a two year old such as employment history, etc.).

In addition to the display settings, further novel aspects of the present disclosure are directed to the ability to define compound object properties. In particular, compound object properties may refer to, for example, settings for values of the compound object. Example properties may include, but are not limited to, a calculated value of an associated field, an expected format of a value (e.g., data format or display format), permissions to view or edit values, data validation for values, conditional formatting, etc. Such aspects will be described in further detail herein.

FIG. 4A illustrates an example schema properties user interface.

In some examples, a schema properties user interface is used to define fields and field properties for a particular schema. In this example, the schema properties user interface 402 defines the fields and the field properties for a "Person" schema. In this example, the following fields are defined: "Name," "Age," "Birthday," "Address," and "Salary." The example schema properties user interface 402 provides the ability to define, where possible, the following properties: a calculated value property 406 of the associated field, a format property 408 of the associated value, a permissions property 410 of the associated value, and a visibility property 412 indicating whether the value is visible in the cell view. Although these particular properties are identified in the schema properties user interface 402, the disclosure is not intended to be so limiting. Rather, the schema properties user interface 402 can include more or fewer definable properties. For example, the schema properties user interface 402 may also include display settings, providing the ability to define where associated values are laid out in the cell view, card view, or both. In some embodiments, the schema properties user interface 402 can also provide a user interface that helps a user specify various card views. In some examples, a drag and drop interface where fields are added and manipulated on a card (ex. font size changed, label removed, fields rearranged) to create a card rendering view may also be provided.

The calculated value property 406 allows a user to define a calculated result as the value for the associated field. In this example, the "Age" field has a calculated value defined by the formula "Today ( )—Birthday." This formula references the example function "Today ( )" which represents the current date as well as the "Birthday" field to arrive at a calculated result, which is the person's age for the particular date. Accordingly, the calculated value property 406 includes the definition of a calculated formula that is updatable. In some embodiments, the calculated formula may be updated according to any frequency (e.g., daily, monthly, weekly, yearly, etc.) and in other embodiments, the calculated formula is updated upon a user's request to refresh the calculated value. In other embodiments, the calculated formula is updated at any time the calculation engine of the spreadsheet application executes to update one or more values in the spreadsheet.

The format property 408 allows the user to define the format of the received value. Format properties may be, for example, a string, number, date, compound data object, image, error, etc. Format properties may also define strict data typing rules that describe a particular pattern in which data is to be received. For example, a phone number may be strictly type so as to be in the following format: "(_____)_____-_____." Format properties may further include validation conditions to specify valid values (e.g., an age cannot be less than 0). Format properties may also include the specification of conditional formatting for a field and associated value stored in the compound object. In another example, conditional formatting alerts may also defined such that any value meeting the condition defined in the conditional formatting may surface to the cell view. Furthermore, format properties may include third party rendering code may be used to represent a value. In the illustrated example, the city of the first compound object 302 is displayed as a map, which may be provided by third party rendering code. Additionally, format properties may include the return of, for example, a graph to show trends.

The permissions property 410 allows the user to define whether the associated value can be viewed or edited by a particular person or group of people. In an example, the permissions property 410, if selected, would result in a permissions user interface that allows specification of the type of permission (e.g., read, write) as well as the permission level required to view or edit the particular data. An example permissions user interface is illustrated and described with reference to FIG. 5.

The visibility property 412 allows the user to define whether the particular value may be visible in the cell view. In some embodiments, the value of each selected field is displayed in the cell view. In some embodiments, the cell view displays the selected values in the order in which the associated field is displayed in the schema properties user interface 402. For example, the fields selected to be visible in the cell are "Name," "Age," and "Address" in that order.

Accordingly, in some embodiments, the cell view will display the corresponding values in that particular order. In other embodiments, another user interface may be provided to assist in the layout of the cell view. In some embodiments, the user can select whether the field names are displayed in the cell view. Additionally, a user interface editing experience may be provided to create and manipulate the cell view. In embodiments, such a user interface may be visual and interactive in which a user can drag around locations of fields, have "snapping" and layout behaviors, and also allow features like font properties to be manipulated. In other embodiments, the spreadsheet application itself may determine an appropriate layout.

In this example, it is noted that the "Address" field is marked as requiring permissions and is also marked as being visible in the cell. Accordingly, in this embodiment, for those people or groups who can view the associated value, that value will also be displayed in the cell view. However, for those people without the appropriate level of permissions, that associated value will not be viewable in either the card or cell view. Furthermore, in some embodiments, such values requiring permissions may be a calculated value and therefore may depend on one or more other values or equations that may change. Nevertheless, in some embodiments, the value may still not be presented to users who do not have the necessary permissions to view that value. In other embodiments, the spreadsheet application may cache a certain value that it might display to users not having the requisite permission level. Alternatively or additionally, in other embodiments, a calculation error may result.

In some embodiments, a field can be deleted from the schema properties user interface 402 by selecting, for example, the "Delete" icon (e.g., "x") adjacent to the listed field. In other embodiments, fields may also be added to the schema definition by selecting, for example, the "New" icon. Deleting or adding fields correspondingly removes or adds values to the schema. In some embodiments, deleting a field or adding one may adjust all of the formulas that use that particular named schema so it is applied to other compound objects. In some embodiments, a user interface may be provided to assist in the layout of the cell view.

FIG. 4B illustrates an alternative example schema properties user interface for the first compound object 302 illustrated in FIG. 3.

This particular schema properties user interface 414 lists the fields and associated properties of the first compound object 302 illustrated in FIG. 3. In particular, the schema properties user interface 414 includes the following fields 404: "Name," "Email," and "City." Additionally, several format properties 408 are identified. In particular, the "Name" field and the "Email" field have a format identified as "General String" while the "City" field has a format identified as a "Map Image" and a corresponding URL. As illustrated and described with reference to FIG. 3, the card view 306 of the first compound object 302 displays the "City" value as a map rendering. Accordingly, the format identified for the "City" field is a URL directed to an image of a map. In some embodiments, this is a URL directed to a storage location of a local database, while in other embodiments, this is a URL directed to a location to a third party database. Additionally, no permission values 410 are identified in the schema properties user interface 414. Furthermore, the visibility property 412 of the schema properties user interface 414 indicates that the "Name" and "Email" fields are to be visible in the cell view.

Figure 4C:
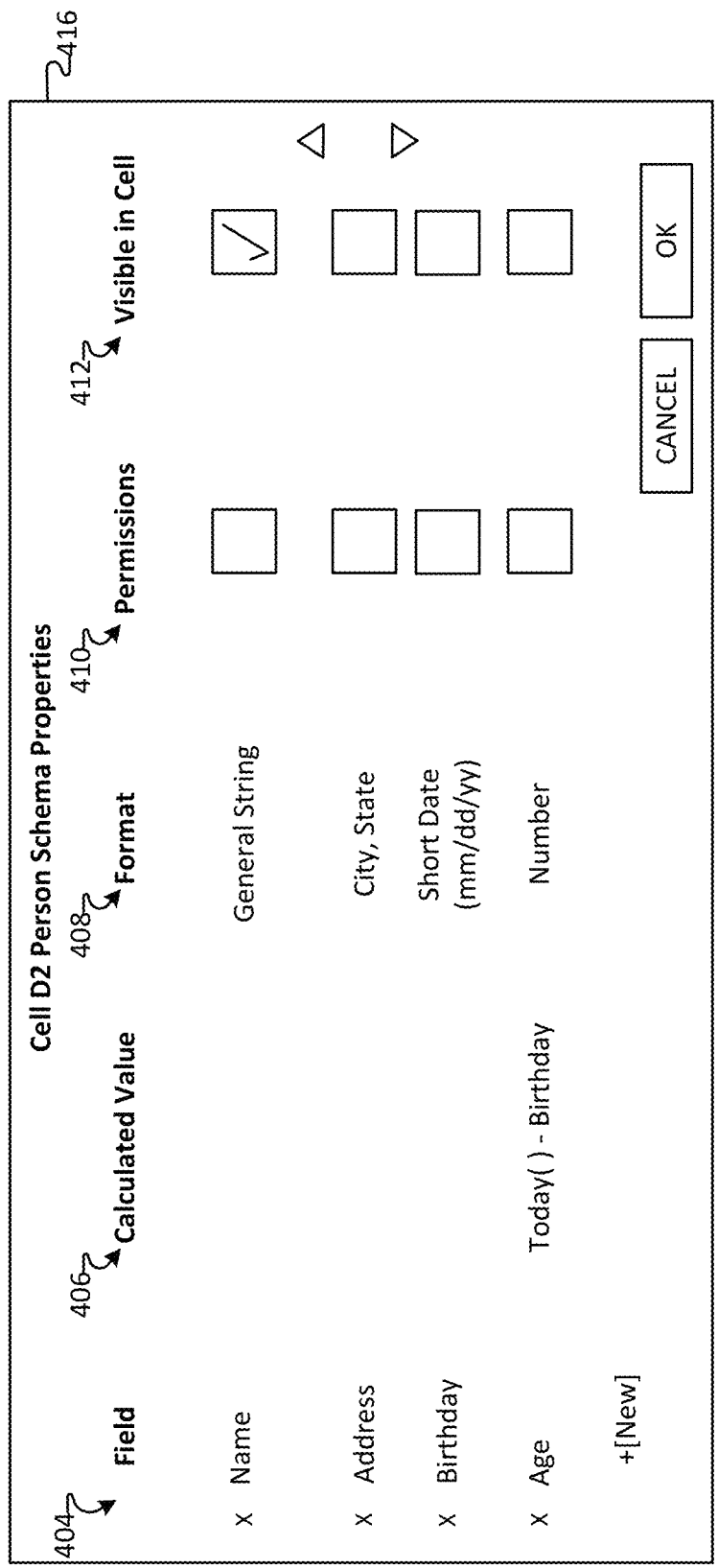
FIG. 4C illustrates an alternative example schema properties user interface for the second compound object illustrated in FIG. 3.

FIG. 4C illustrates an alternative example schema properties user interface for the second compound object 308 illustrated in FIG. 3.

This particular schema properties user interface 416 lists the fields and associated properties of the second compound object 308 illustrated in FIG. 3. In particular, the schema properties user interface 416 includes the following fields 404: "Name," "Address," "Birthday," and "Age." The schema properties user interface 416 indicates a calculated value property 406 for the "Age" field. In particular, the "Age" field corresponds to the calculated value "Today ( )—Birthday" to arrive at an age value. Additionally, in the schema properties user interface 416, several format properties 408 are identified. The "Name" field has a format identified as "General String," the "Address" field has a format identified as a "City, State," the "Birthday" field has a format identified as "Short Date (mm/dd/yyyy)," and the "Age" field has a format identified as "Number." Additionally, no permission values 410 are identified in the schema properties user interface 416. Furthermore, the visibility property 412 of the schema properties user interface 416 indicates that only the "Name" field is to be visible in the cell view.

Figure 4D:
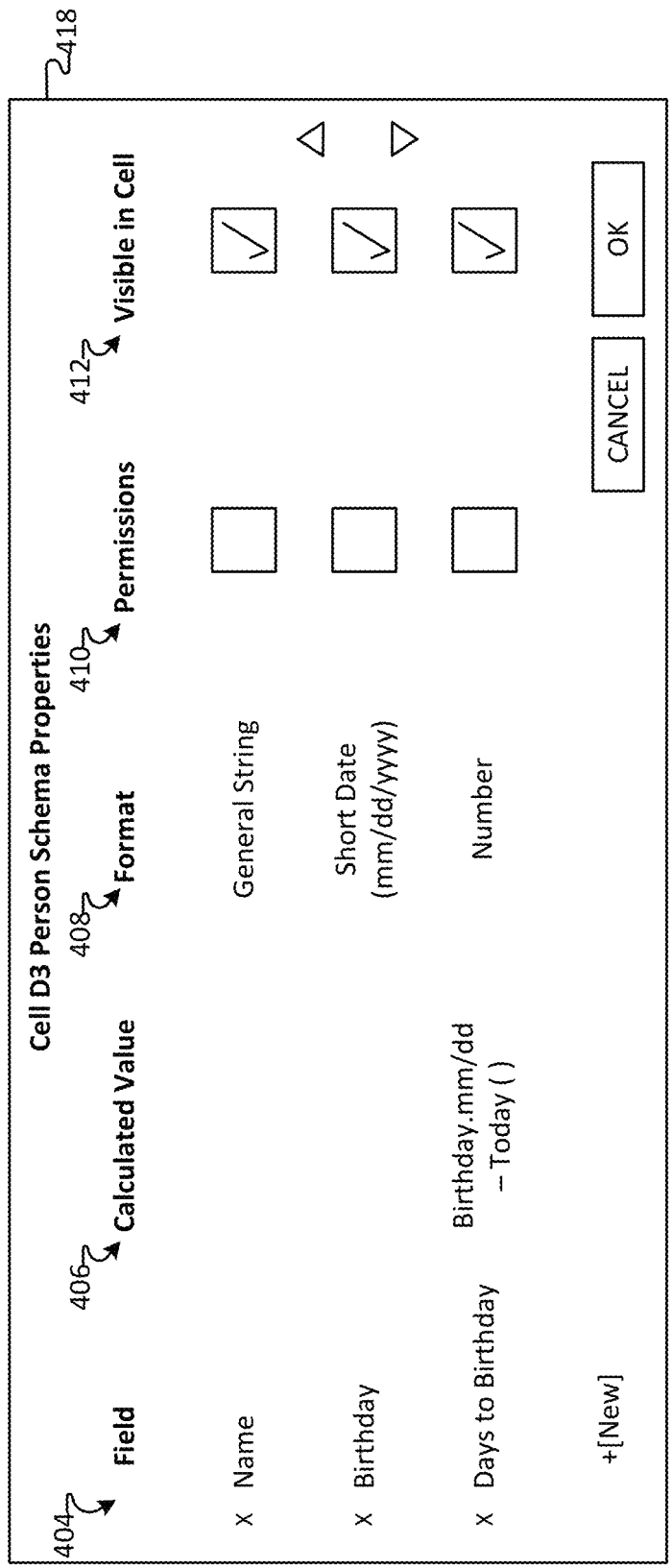
FIG. 4D illustrates an alternative example schema properties user interface for the third compound object illustrated in FIG. 3.

FIG. 4D illustrates an alternative example schema properties user interface for the third compound object 314 illustrated in FIG. 3.

This particular schema properties user interface 418 lists the fields and associated properties of the third compound object 318 illustrated in FIG. 3. In particular, the schema properties user interface 418 includes the following fields 404: "Name," "Birthday," and "Days to Birthday." The schema properties user interface 418 indicates a calculated value property 406 for the "Days to Birthday" field. In particular, the "Days to Birthday" field corresponds to the calculated value "Birthday.mm/dd—Today ( )" to arrive days to birthday value. Additionally, in the schema properties user interface 418, several format properties 408 are identified. The "Name" field has a format identified as "General String," the "Birthday" field has a format identified as a "Short Date (mm/dd/yyyy)," and the "Days to Birthday" field has a format identified as "Number." Additionally, no permission values 410 are identified in the schema properties user interface 418. Furthermore, the visibility property 412 of the schema properties user interface 416 indicates that the "Name," "Birthday," and "Days to Birthday" fields are to be visible in the cell view.

Figure 5:
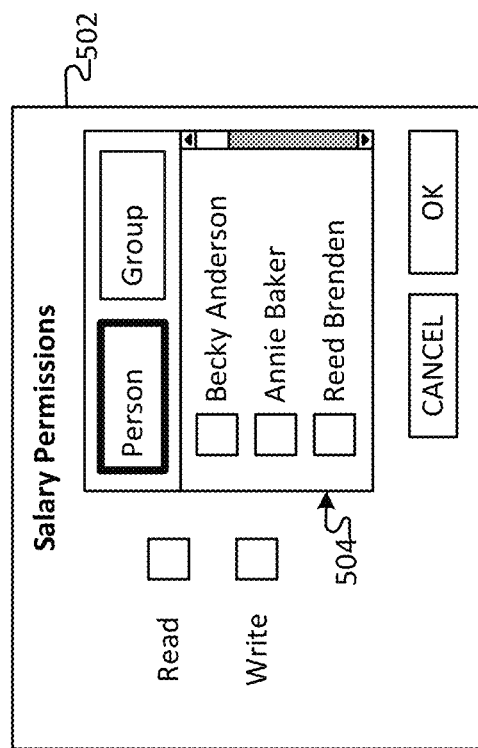
FIG. 5 illustrates an example permissions user interface.

FIG. 5 illustrates an example permissions user interface.

The example permissions user interface 502 may be used to define the people or groups of people who can view or edit a particular value. For example, the example permissions user interface 502 may be displayed in response to a selection of the permissions property in the schema properties user interface 402, as illustrated and described with reference to FIG. 4. In this example, the permissions user interface 502 defines the permissions associated with a "Salary" field and therefore identifies permissions for people or groups of people who can view the corresponding salary value. In this example, the permissions user interface 502 includes a list of people 504 that can be filtered by "Person" or "Group." Accordingly, in this example, read or write permissions can be defined for each person individually or it can be defined for groups of people (e.g., departments, positions, etc.). In this example, if a permission is not defined for a person, the default value is no permission to view or edit the value. In some embodiments, permission levels may be tied to an organization's permissions.

Additionally or alternatively to extensibility from a card user interface (e.g., schema properties user interface illustrated in FIGS. 4A-4D), compound objects may also be extensible through code. In particular, a developer, for example, can write code to define a new compound object type. In an example, the spreadsheet application may expose an API to allow a developer to externally define objects to exist in the spreadsheet. In such an example, the API will allow a developer to draw any value into a cell and have the necessary callbacks so the object created by the developer can use the spreadsheet application to respond to events such as, for example, resizing of a cell, typing values into the cell, etc. Additionally, the object can also have access to formatting that is applied to that cell. Moreover, in such an example, the API may also allow the developer to define a card view of the compound object, wherein the card view can be edited, resized, and arranged. Alternatively or additionally, the API may also support calculation-based callbacks, so the developer is notified when the calculation engine is executed so the cell in which the compound object exists can calculate, if necessary. Furthermore, the compound object may obtain access to other cell values within the spreadsheet on which compound object may depend. Furthermore, other the developer can implement other APIs to take use built in functionality of the spreadsheet application.

Figure 6:
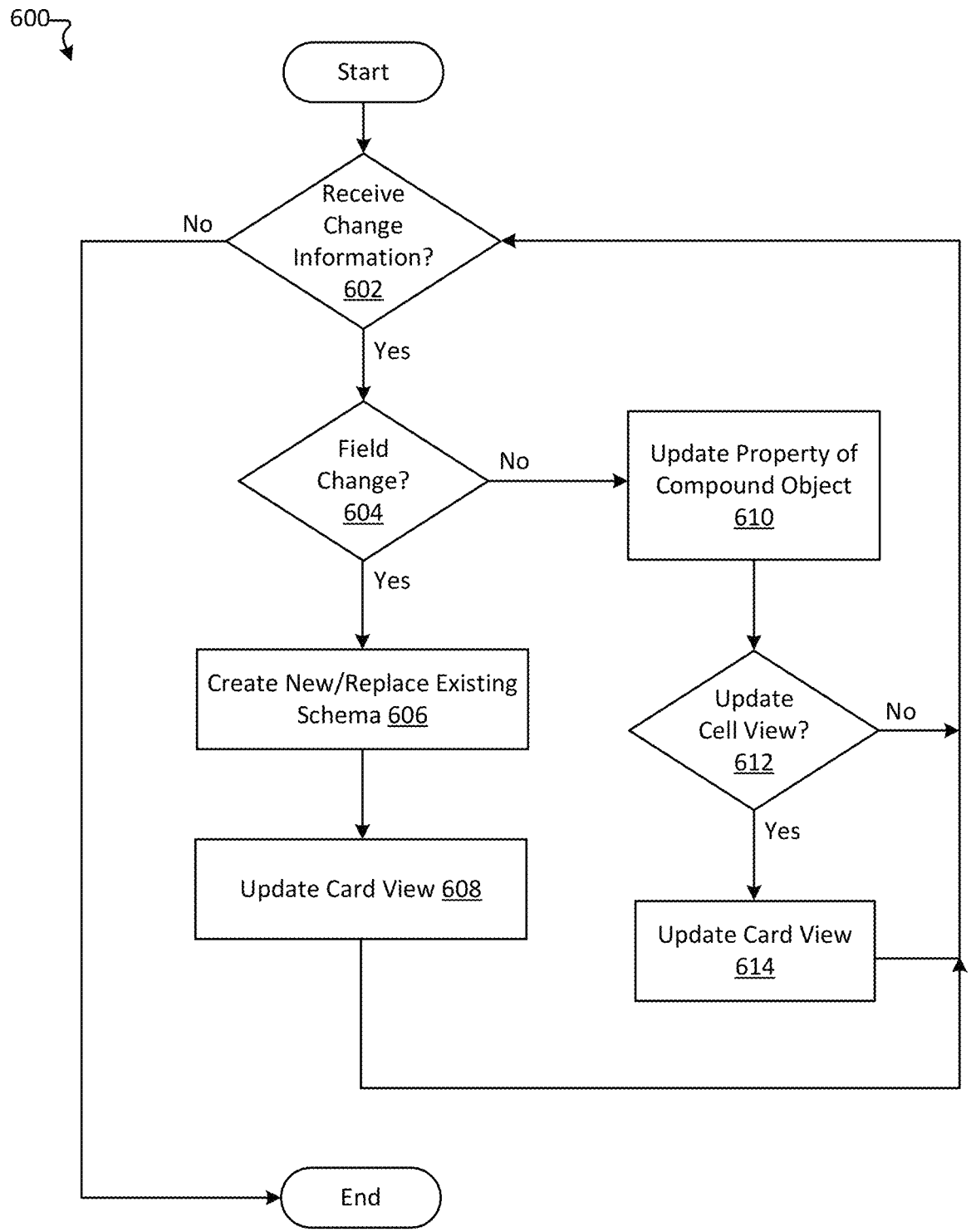
FIG. 6 illustrates a method for updating one or more views of a compound object based on property and field changes to the compound object.

FIG. 6 illustrates a method for updating one or more views of a compound object based on property and field changes to the compound object.

The method 600 begins at the start operation. The method 600 then flows to the receive change information decision operation 602 in which the spreadsheet application determines whether a change is made. In some embodiments, a change may be made to a field of the schema definition of the compound object. Or alternatively, a change may be made to a property of the field. Fields and properties are illustrated and described with reference to FIGS. 4A-4D. If the spreadsheet application determines that no change is made, the method 600 ends.

If the spreadsheet application determines that a change is made, method 600 flows to the field change decision operation 604. In the field change decision operation 604, the spreadsheet application determines whether the change is made to a field of the schema definition of the compound object. In particular, the spreadsheet application determines whether the change identified in the receive change information decision operation 602 is made to a field of the schema definition of the compound object. As described herein, a compound object is a data type that stores multiple values in a single cell and may be defined by a schema, which provides the structural definition of the compound object. The schema identifies the type of structured data (e.g., record, matrix, table, vector, array, etc.) and the one or more corresponding fields. As illustrated and described with reference to FIGS. 4A-4C, example fields of a person schema may be "Name," "Age," "Birthday," "Email," "Address," "Salary," etc.

If the spreadsheet application determines that a change is made to a field, the method 600 proceeds to the create new or replace existing schema operation 606. In the create new or replace existing schema operation 606, a new schema definition is created or an existing schema is replaced. In particular, a new schema may be created or an existing schema may be replaced in response to the changed field detected in operations 602 and 604. As described herein, aspects of the present disclosure provide the ability to edit (e.g., edit, add, or delete fields) a schema definition and save that edited schema definition as a new schema (e.g., Person Schema 1, Person Schema 2, Person Schema 3 . . . ) or replace the existing schema. In some embodiments, schema definitions are stored in storage (e.g., storage 108).

In the update card view operation 608, the corresponding card view of the compound object is updated in response to the changed field detected in operations 602 and 604. As described herein, the card view displays values stored in the compound object, wherein the values are each associated with a field. In some embodiments, the corresponding fields may also be displayed in the compound object. Accordingly, if a change is made to a field of the schema definition of the compound object, the corresponding value may also change in some embodiments. Thus, the corresponding card view is updated in operation 608 based on the changed field.

As described herein, in the receive change information decision operation 602, the spreadsheet application determines whether a change is made to a field of the schema definition of the compound object or to a property of the field. Accordingly, in the field change decision operation 604, if it is determined that no change is made to a field, the method 600 flows to the update property of compound object 610. In the update compound object property change operation 610, the spreadsheet application determines that a change to a property definition is made. As described herein, a compound object property may refer to, for example, settings of values of the compound object. Example properties may include, but are not limited to, a calculated value of an associated field, an expected format of a value, permissions to view or edit values, data validation for values, conditional formatting, etc.

In the update cell view decision operation 612, the spreadsheet application determines whether the cell view also needs to be updated. As illustrated and described with reference to FIGS. 4A-4D, a property setting for the value may be whether the value is visible in the cell view. If a setting affects the display of the value (e.g., a format change or whether the value is now selected to be visible in the cell), the method 600 proceeds to the update cell view operation 614.

In the update cell view operation 614, the cell view is updated based on the change detected in operation 610. In some embodiments, an update to the cell view may correspond to updating the cell view to reflect the identified change. For example, the cell view may be updated to display the changed value, the changed format of the value, an addition of a value to the cell view, a deletion of a value from the cell view, a changed layout of the cell view, a change in conditional formatting, etc.

The method 600 then flows to the receive change information operation 602 to identify whether any additional changes have been made.

As should be appreciated, operations 602-614 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 7:
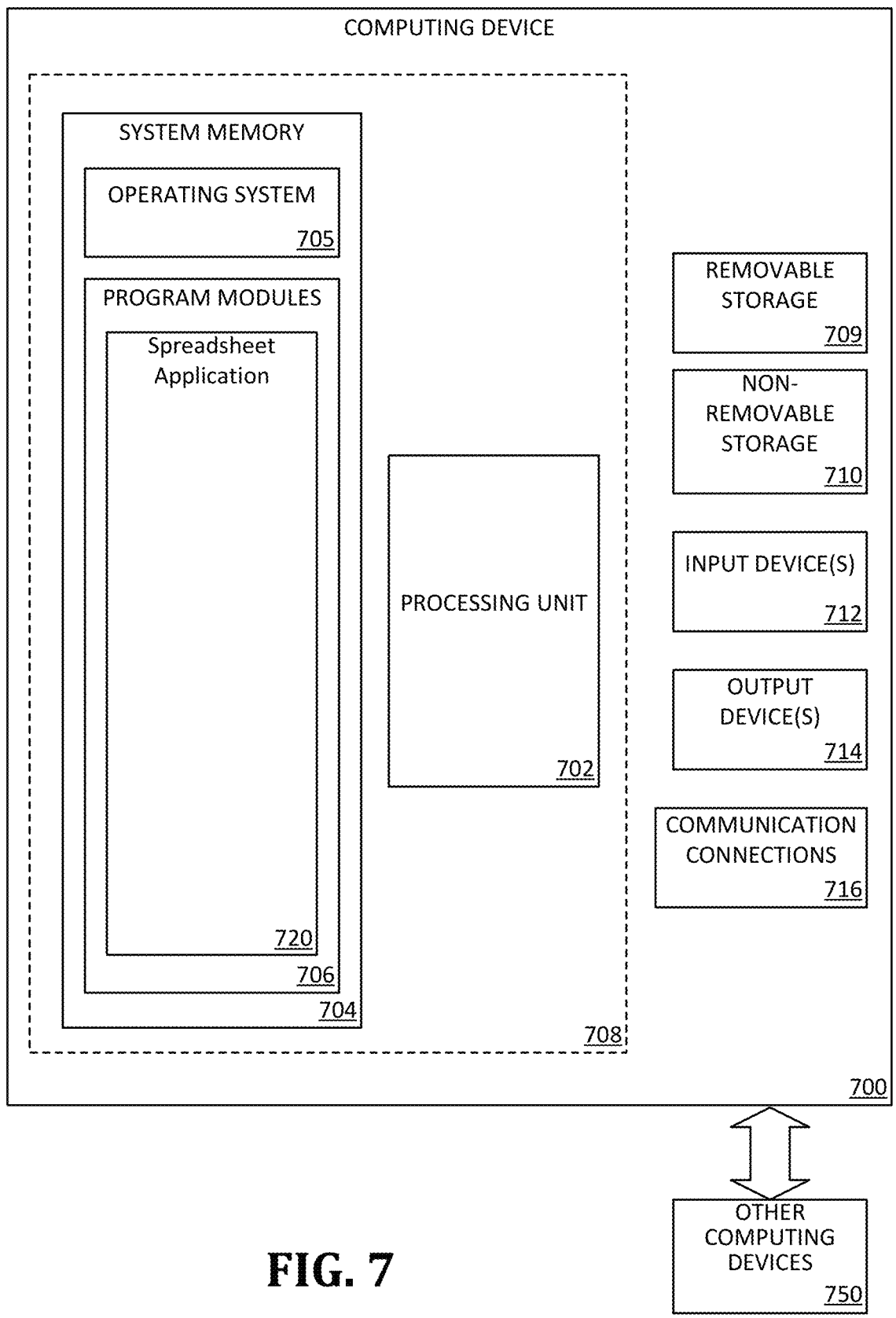
FIG. 7 is a block diagram illustrating physical components (e.g., hardware) of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a spreadsheet application 720 on a computing device (e.g., server computing device 108 and/or client computing device 104), including computer executable instructions for spreadsheet application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running spreadsheet application 720.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710. As stated above, a number of program modules and data files may be stored in the system memory 704. While executing on the processing unit 702, the program modules 706 (e.g., spreadsheet application 720) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
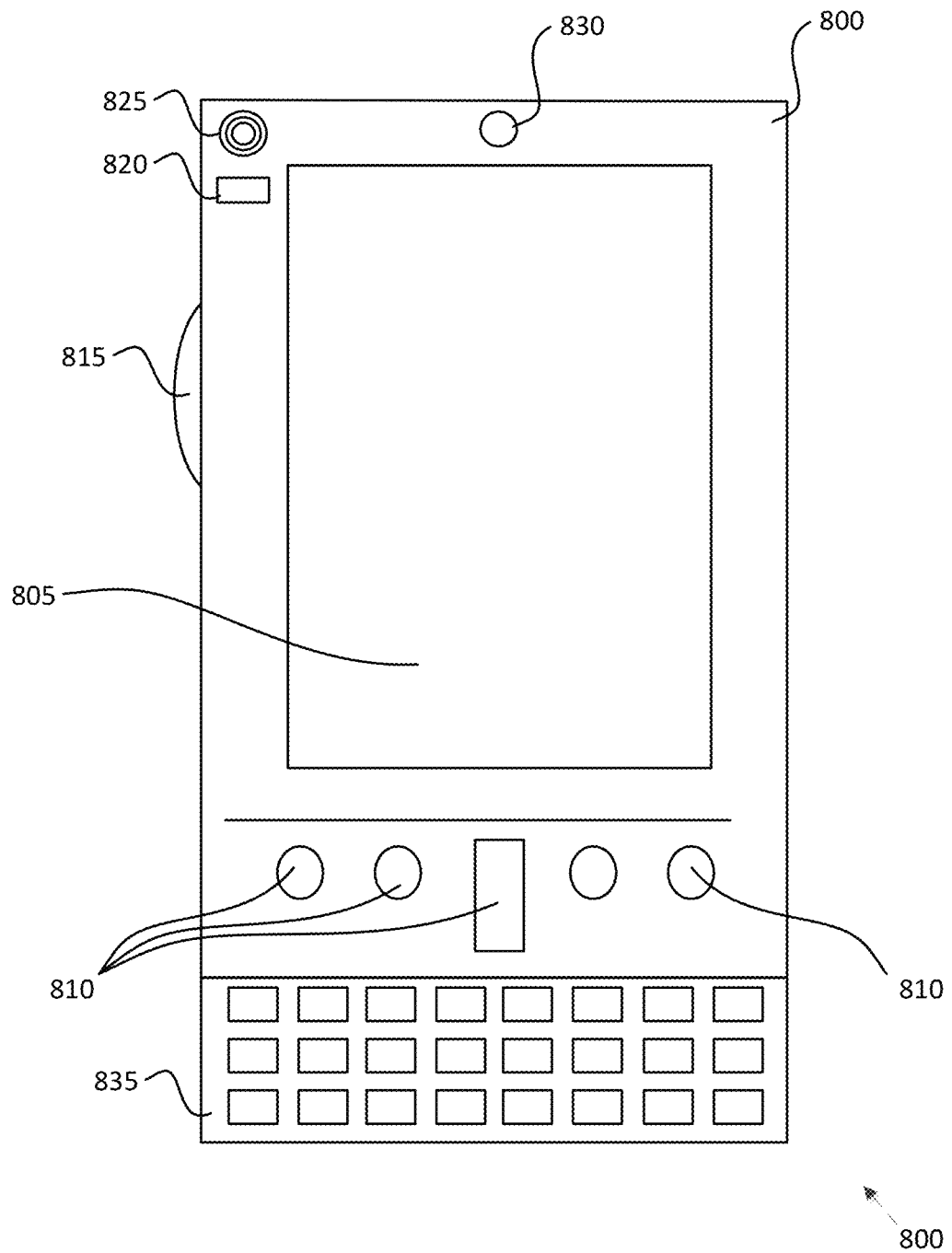
FIG. 8A and FIG. 8B illustrate a mobile computing device, for example, a mobile telephone, a smart phone, wearable computer (such as a smart watch), a tablet computer, a laptop computer, and the like, with which embodiments of the disclosure may be practiced.
Figure 8B:
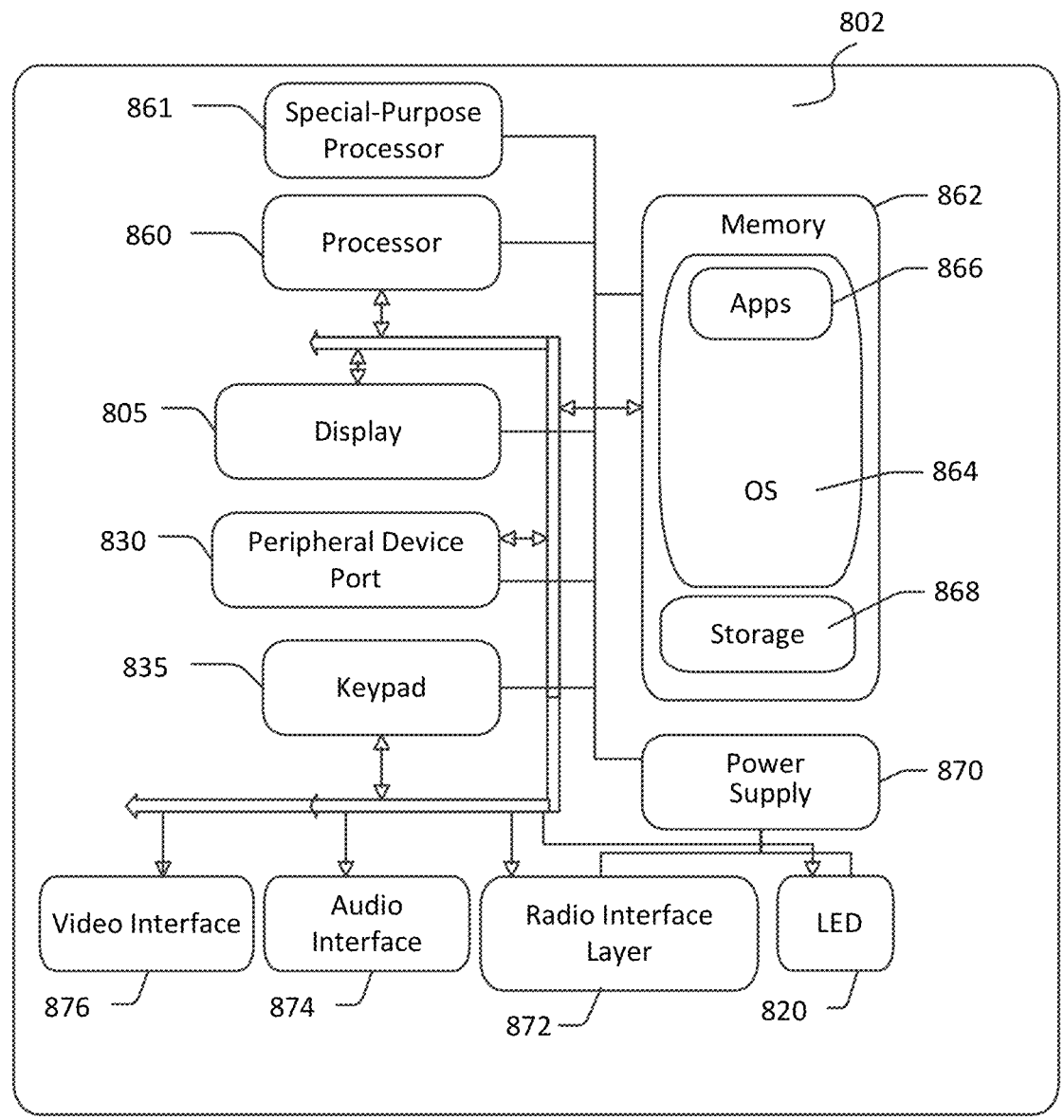

FIG. 8A and FIG. 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for associating one or more images with one or more cells of a spreadsheet as described herein (e.g., field component, associate component, array component, hybrid component, operation component, and/or UX component, etc.).

The system 802 has a power supply 870, which may be implemented as one or more batteries. The power supply 870 may further include an external power source, such as an AC adapter or a powered docking cradle that supplements or recharges the batteries. The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825

(e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

Figure 9:
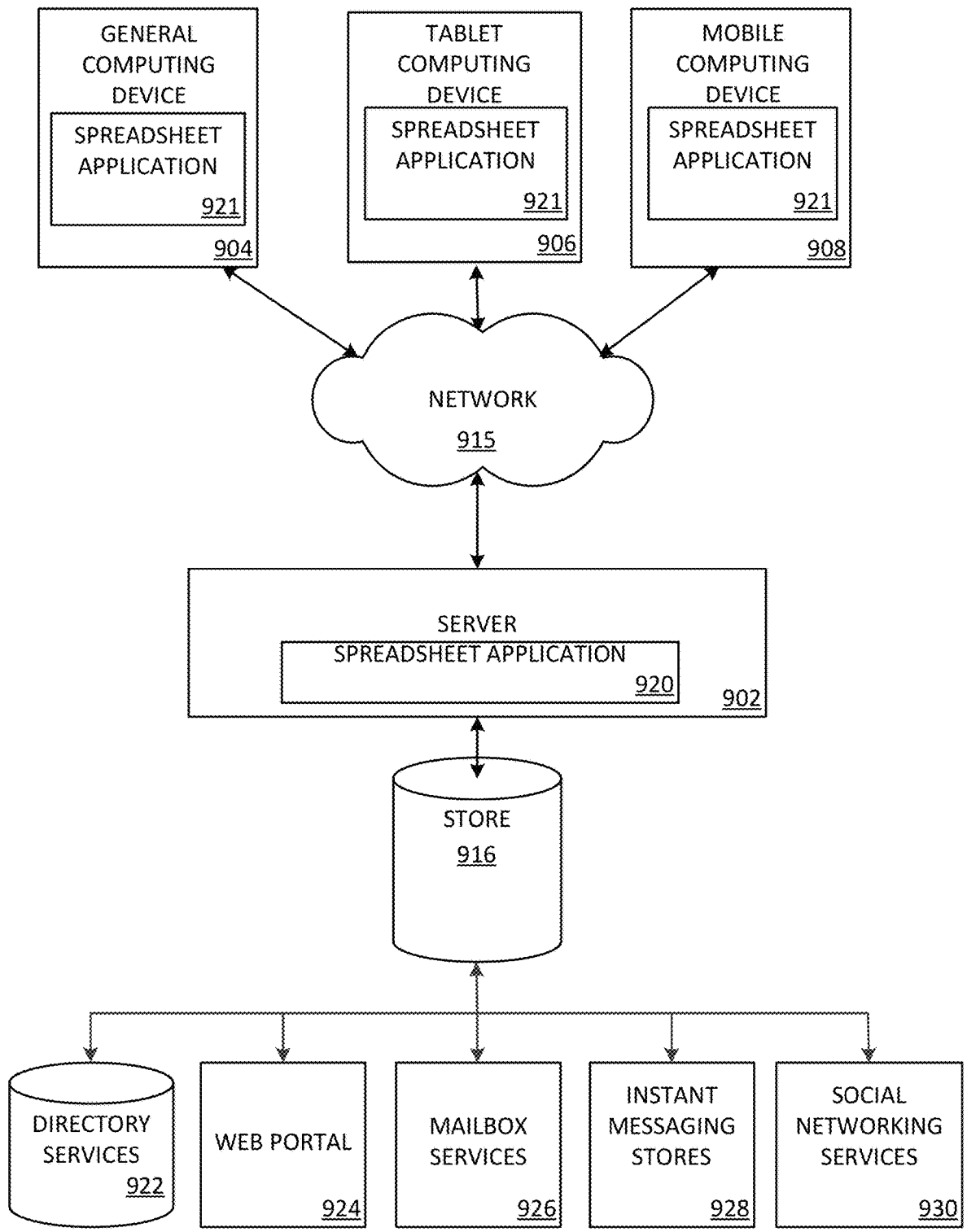
FIG. 9 illustrates one aspect of the architecture of a system for processing data received at a computing system from a remote source, such as a general computing device (e.g., personal computer), tablet computing device, or mobile computing device, as described above.

FIG. 9 illustrates one aspect of the architecture of a system for processing data received at a computing system from a remote source, such as a general computing device 904 (e.g., personal computer), tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking service 930. The spreadsheet application 921 may be employed by a client that communicates with server device 902, and/or the spreadsheet application 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above may be embodied in a general computing device 904 (e.g., personal computer), a tablet computing device 906 and/or a mobile computing device 908 (e.g., a smart phone). Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
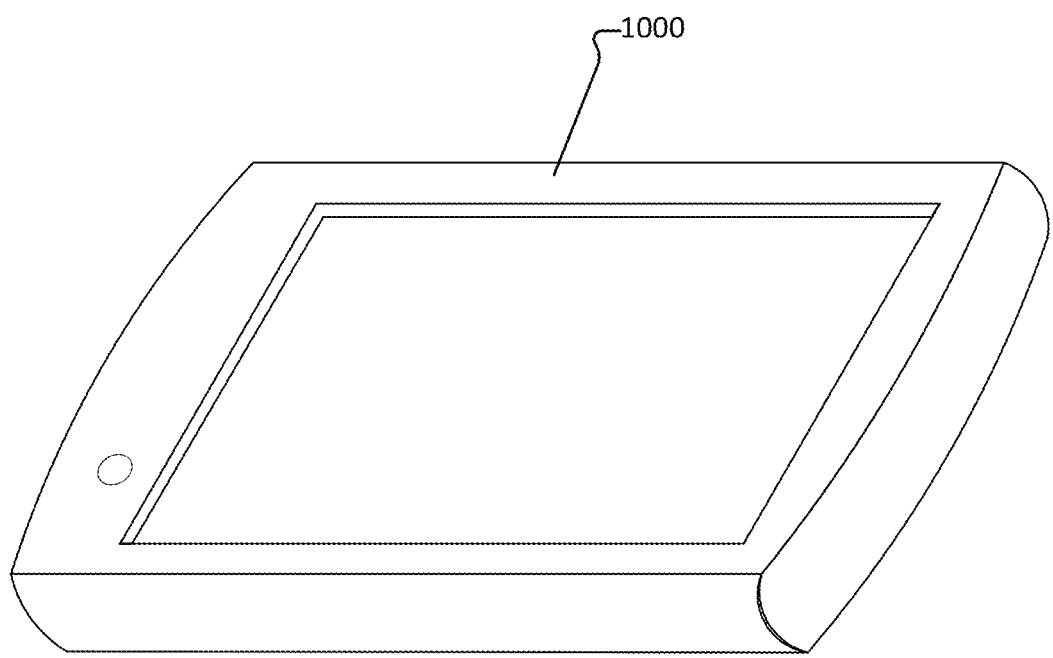
FIG. 10 illustrates an exemplary tablet computing device that may execute one or more aspects disclosed herein.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this disclosure are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform operations comprising:
      creating a compound object associated with a spreadsheet cell, the compound object including:
         a first field with a first value,
         a first visibility property defining whether the first value is visible or not visible in a cell view contained by the spreadsheet cell,
         a second field with a second value, and
         a second visibility property defining whether the second value is visible or not visible in the cell view contained by the spreadsheet cell;
      providing, for display, the cell view of the spreadsheet cell with the first value visible based on the first visibility property and the second value visible based on the second visibility property;
      receiving an indication of a change to the first visibility property; and
      providing, for display, an updated cell view of the spreadsheet cell with the first value not visible based on the change to the first visibility property and the second value maintained as visible based on the second visibility property.

2. The system of claim 1, wherein the indication of the change to the first visibility property is received at a schema properties user interface.

3. The system of claim 2, wherein the schema properties user interface displays the first field, the first visibility property, the second field, and the second visibility property.

4. The system of claim 3, wherein the first visibility property defines a permission level of the first field, the permission level defining one or more users who can view the first value.

5. The system of claim 1, wherein the computer executable instructions that, when executed by the at least one processing unit, cause the system to perform the operations comprising:
   receiving an indication of a second change to the first visibility property;
   determining, based on the indication of the second change, to update the cell view; and
   based on a determination, updating the cell view.

6. The system of claim 1, wherein the computer executable instructions that, when executed by the at least one processing unit, cause the system to perform the operations comprising, based on the change to the first visibility property, updating a card view of the compound object.

7. The system of claim 1, wherein the computer executable instructions that, when executed by the at least one processing unit, cause the system to perform the operations comprising updating a schema of the compound object in response to receiving the indication of the change to the first visibility property.

8. A method comprising:
   creating a compound object associated with a spreadsheet cell, the compound object including:
      a first field with a first value,
      a first visibility property defining whether the first value is visible or not visible in a cell view contained by the spreadsheet cell,
      a second field with a second value, and
      a second visibility property defining whether the second value is visible or not visible in the cell view contained by the spreadsheet cell;
   providing, for display, the cell view of the spreadsheet cell with the first value not visible based on the first visibility property and the second value visible based on the second visibility property;
   receiving an indication of a change to the first visibility property; and
   providing, for display, an updated spreadsheet cell with the first value visible based on the change to the first visibility property and the second value maintained as visible based on the second visibility property.

9. The method of claim 8, wherein the indication of the change to the first visibility property is received at a schema properties user interface.

10. The method of claim 9, wherein the schema properties user interface displays the first field, the first visibility property, the second field, and the second visibility property.

11. The method of claim 10, wherein the first visibility property defines a permission level of the first field, the permission level of the first field defining a first set of one or more users who can view the first value.

12. The method of claim 10, wherein the second visibility property defines a permission level of the second field, the permission level of the second field defining a second set of one or more users who can view the second value.

13. The method of claim 10, further comprising based on the change to the first visibility property, updating a card view of the compound object.

14. The method of claim 10, further comprising updating a schema of the compound object in response to receiving the indication of the change to the first visibility property.

15. The method of claim 8, further comprising:
   receiving an indication of a second change to the first visibility property;
   determining, based on the indication of the second change, to update the cell view; and
   based on a determination, updating the cell view.

16. A computer-readable storage medium storing computer executable instructions that, when executed by at least one processing unit, cause a computing device to:
   create a compound object associated with a spreadsheet cell, the compound object including:
      a first field with a first value,
      a first visibility property defining whether the first value is visible or not visible in a cell view contained by the spreadsheet cell,
      a second field with a second value, and
      a second visibility property defining whether the second value is visible or not visible in the cell view contained by the spreadsheet cell;
   provide, for display, the cell view of the spreadsheet cell with the first value visible based on the first visibility property and the second value not visible based on the second visibility property;
   receive an indication of a change to the first visibility property; and
   provide, for display, an updated cell view of the spreadsheet cell with the first value not visible based on the change to the first visibility property and the second value maintained as not visible based on the second visibility property.

17. The computer-readable storage medium of claim 16, wherein the first visibility property defines a permission level of the first field, the permission level defining one or more users who can view the first value.

18. The computer-readable storage medium of claim 16, wherein the indication of the change to the first visibility property is received at a schema properties user interface.

19. The computer-readable storage medium of claim 18, wherein the schema properties user interface displays the first field, the first visibility property, the second field, and the second visibility property.

20. The computer-readable storage medium of claim 16, wherein the computer executable instructions that, when executed by at least one processing unit, further cause the computing device to update a schema of the compound object in response to receiving the indication of the change to the first visibility property.

* * * * *